(12) United States Patent
Zhang et al.

(10) Patent No.: US 11,963,185 B2
(45) Date of Patent: Apr. 16, 2024

(54) USER EQUIPMENT COMPLEXITY REDUCTION FOR PHYSICAL DOWNLINK CONTROL CHANNEL REPETITION RECEPTION

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 17/440,456

(22) PCT Filed: Jul. 31, 2020

(86) PCT No.: PCT/CN2020/106279
§ 371 (c)(1),
(2) Date: Sep. 17, 2021

(87) PCT Pub. No.: WO2022/021356
PCT Pub. Date: Feb. 3, 2022

(65) Prior Publication Data
US 2022/0304037 A1    Sep. 22, 2022

(51) Int. Cl.
*H04W 72/12* (2023.01)
*H04L 1/08* (2006.01)
(Continued)

(52) U.S. Cl.
CPC .............. *H04W 72/23* (2023.01); *H04L 1/08* (2013.01); *H04L 5/0053* (2013.01)

(58) Field of Classification Search
CPC .... H04B 7/0626; H04W 72/20; H04W 72/23; H04W 72/232; H04W 72/0457; H04L 1/08; H04L 5/0053
See application file for complete search history.

(56) References Cited

U.S. PATENT DOCUMENTS

| 2020/0153572 | A1* | 5/2020 | Tsai | H04B 7/0626 |
| 2020/0154450 | A1* | 5/2020 | Zhou | H04W 72/20 |
| 2022/0295558 | A1* | 9/2022 | Lei | H04L 5/001 |

FOREIGN PATENT DOCUMENTS

| CN | 111435870 | 7/2020 |
| EP | 4156830 A1 | 3/2023 |

(Continued)

OTHER PUBLICATIONS

3rd Generation Partnership Project; Technical Specification Group Radio Access Network; NR; User Equipment (UE) radio access capabilities (Release 16), 3GPP TS 38.306 V16.1.0, Jul. 2020, 106 pages.

(Continued)

*Primary Examiner* — Vinncelas Louis
(74) *Attorney, Agent, or Firm* — Kilpatrick Townsend & Stockton LLP

(57) ABSTRACT

The present application relates to devices and components including apparatus, systems, and methods for search space grouping to facilitate repeated transmissions of a physical downlink control channel in wireless communication systems.

20 Claims, 14 Drawing Sheets

(51) Int. Cl.
  *H04L 5/00* (2006.01)
  *H04W 72/23* (2023.01)

(56) References Cited

FOREIGN PATENT DOCUMENTS

| WO | 2019244218 | A1 | 12/2019 |
|----|------------|----|---------|
| WO | 2020032779 |    | 2/2020  |
| WO | 2020033652 | A1 | 2/2020  |

OTHER PUBLICATIONS

International Patent Application No. PCT/CN2020/106279, International Preliminary Report on Patentability, dated Feb. 9, 2023, 5 pages.
Draft Agenda, 3GPP TSG RAN WG1 Meeting #92bis, R1-1803570, 2018, 10 pages.
Draft Agenda, 3GPP TSG RAN WG1 Meeting #92, R1-1801300, 2018, 9 pages.
International Patent Application No. PCT/CN2020/106279, International Search Report and Written Opinion, dated Apr. 29, 2021, 8 pages.
3rd Generation Partnership Project; Technical Specification Group Radio Access Network; NR; Physical layer procedures for control (Release 16), 3GPP TS 38.213 V16.2.0, Jun. 2020, 176 pages.
3rd Generation Partnership Project; Technical Specification Group Radio Access Network; NR; Physical layer procedures for data (Release 16), 3GPP TS 38.214 V16.2.0, Jun. 2020, 164 pages.
3rd Generation Partnership Project; Technical Specification Group Radio Access Network; NR; NR and NG-RAN Overall Description; Stage 2 (Release 16), 3GPP TS 38.300 V16.2.0, Jul. 2020, 148 pages.
3rd Generation Partnership Project; Technical Specification Group Radio Access Network; NR; Radio Resource Control (RCC) protocol specification (Release 16), 3GPP TS 38.331 V16.1.0, Jul. 2020, 906 pages.
Summary of Enhancements on Multi-TRP/Panel Transmission, 3GPP TSG RAN WG1 Meeting #98, R1-1909602, Aug. 26-30, 2019, 76 pages.
European Patent Application No. 20946818.0, Extended European Search Report, Feb. 12, 2024, 15 pages.

* cited by examiner

700

Combination 1

Combination 2

Combination 3

Combination 4

800

Combination 1

Combination 2

Combination 3

Combination 4

Combination 5

Combination 1

Combination 2

Combination 3

USER EQUIPMENT COMPLEXITY REDUCTION FOR PHYSICAL DOWNLINK CONTROL CHANNEL REPETITION RECEPTION

CROSS-REFERENCE TO RELATED APPLICATIONS

This application is a 371 U.S. National Phase of PCT International Patent Application No. PCT/CN2020/106279, filed on Jul. 31, 2020; the disclosure of which is incorporated by reference herein in its entirety for all purposes.

BACKGROUND

Release 15 Third Generation Partnership Project "3GPP" Technical Specifications "TSs" provide that a user equipment "UE" can decode a physical downlink control channel "PDCCH" based on a configuration of a search space "SS" and a control channel resource set "CORSET" Repeated transmissions of a PDCCH to enhance coverage may complicate the decoding process.

DETAILED DESCRIPTION

Figure 1:
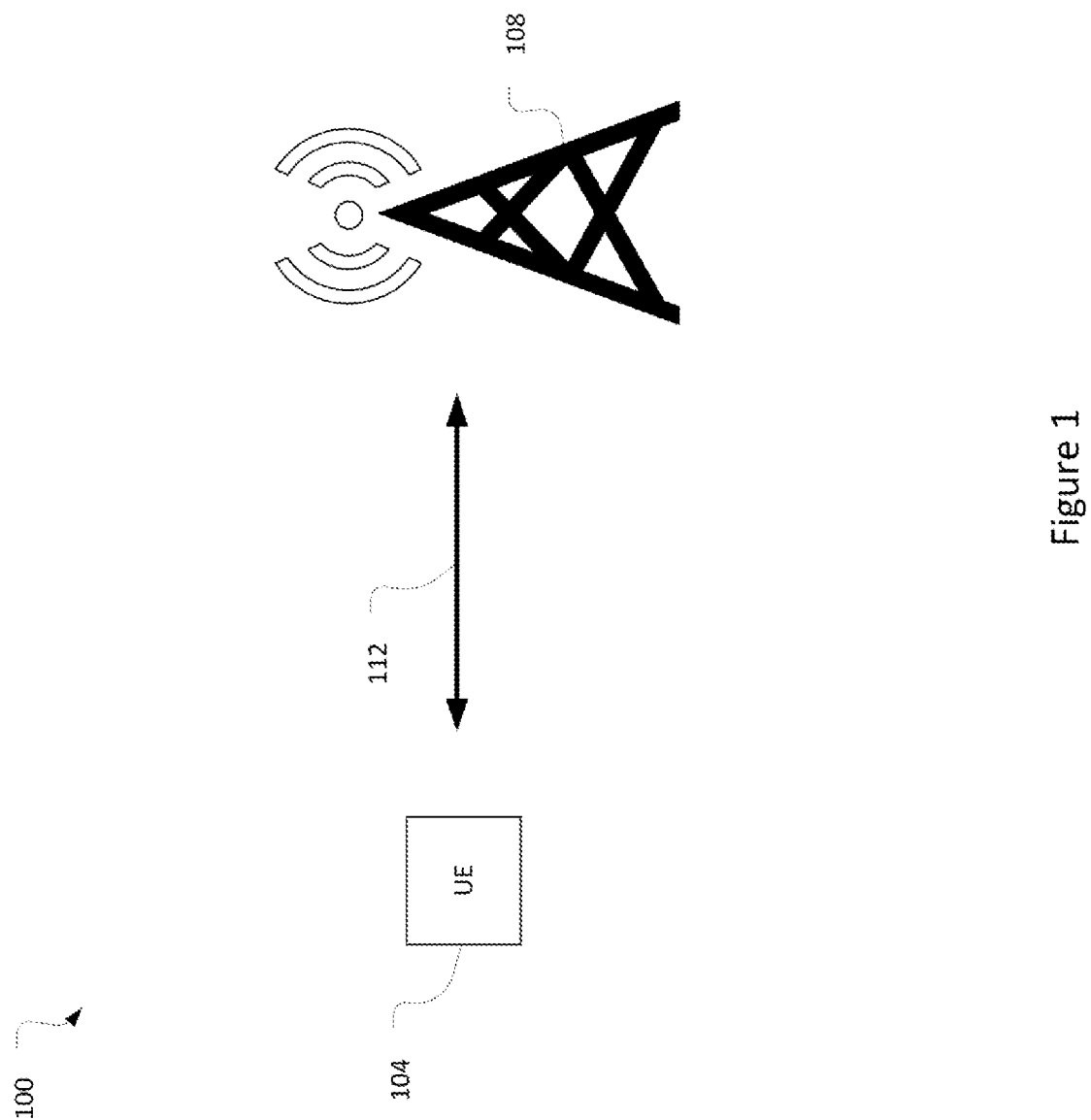
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific integrated. Circuit "ASIC," a field-programmable device "FPD" (e.g., a field-programmable gate array "FPGA," a programmable logic device "PLD," a complex PLD "CPLD," a high-capacity PLD "HCPLD," a structured ASIC, or a programmable system-on-a-chip "SoC"), digital signal processors "DSPs," etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit "CPU," a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a gNB 108. The gNB 108 may provide a wireless access cell, for example, an NR cell, through which the UE may communicate with the gNB 108. The UE 104 and the gNB 108 may communicate over an air interface compatible 3GPP technical specifications such as those that define Fifth Generation "5G" NR system standards.

The UE 104 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, Internet of things "IoT" devices. In some embodiments, the UE 104 may be a reduced-capability UE, also known as an NR-light UE.

The gNB 108 may transmit information (for example, data and control signaling) in the downlink direction by mapping logical channels on the transport channels, and transport channels onto physical channels. The logical channels may transfer data between a radio link control "RLC" and media access control "MAC" layers; the transport channels may transfer data between the MAC and Physical "PHY" layers; and the physical channels may transfer information across the air interface.

The physical channels may include a physical broadcast channel "PBCH"; a physical downlink control channel "PDCCH"; and a physical downlink shared channel "PDSCH."

The PBCH may be used to broadcast a master information block "MIB" to provide information to facilitate access to the NR cell. The MIB may include a system frame number, cell barred flag, and information that may be used to receive a system information block 1 "SIB1." The MIB and the SIB1 may be used to transmit minimum system information that provides a basic parameter set that the UE 104 may use for initial access or acquiring any other system information.

The PBCH may be transmitted along with physical synchronization signals "PSS" and secondary synchronization signals "SSS" in a synchronization signal "SS"/PBCH blocks. The SS/PBCH blocks "SSBs" may be used by the UE 104 during a cell search procedure and for beam selection.

The PDSCH may be used to transfer end-user application data, signaling radio bearer "SRB" messages, system information messages (other than, for example, MIB), and paging messages.

The PDCCH may transfer downlink control information "DCI" that is used by the base station packet scheduler to allocate both uplink and downlink resources. The DCI may also be used to provide uplink power control commands, configure a slot format, or indicate that preemption has occurred.

The gNB 108 may also transmit demodulation reference signals "DMRS" for the different physical channels. The DMRSs may be a sequence that is known to, or discoverable by, the UE 104. The UE 104 may compare a received version of the DMRS with the known DMRS sequence that was transmitted to estimate an impact of the propagation channel. The UE 104 may then apply an inverse of the propagation channel during a demodulation process of a corresponding physical channel transmission. The PDCCH and its associated DMRS may be transmitted using a single antenna port (for example, antenna port 2000).

The information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing "OFDM" symbol in the time domain. Twelve consecutive subcarriers in the frequency domain may compose a resource block. A resource element group "REG" may include one resource block and one OFDM symbol in the time domain, for example, 12 resource elements. A REG bundle includes L REGs, where L is determined by RRC parameter REG-bundle-size. A control channel element "CCE" may represent a group of resources used to transmit PDCCH. One CCE may be mapped to a number of REGs, for example, six REGs.

Figure 2:
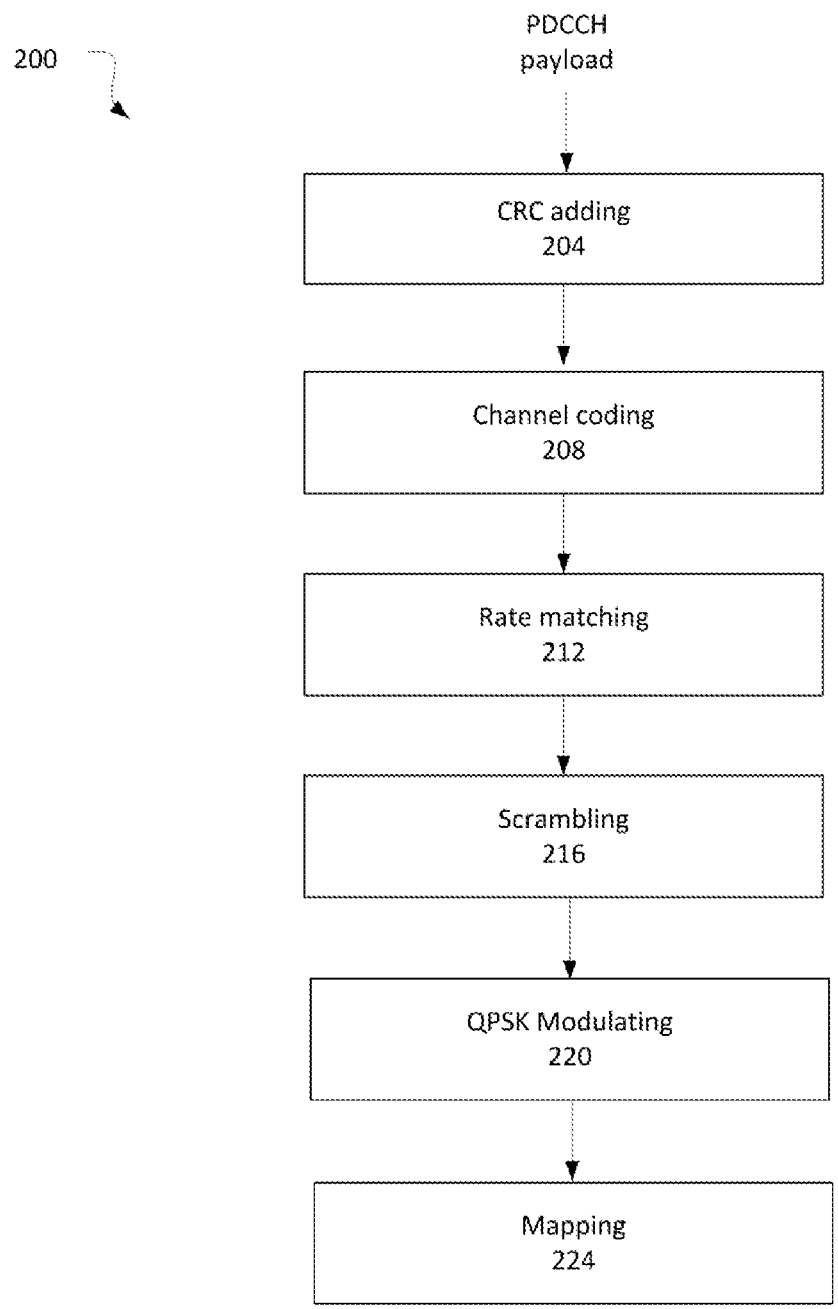
FIG. 2 illustrates a physical downlink control channel encoding process in accordance with some embodiments.

FIG. 2 illustrates a PDCCH encoding process 200 in accordance with some embodiments. The PDCCH encoding process 200 may be performed by the gNB 108 or components thereof, for example, baseband processor 1404A.

At 204, the process 200 may include adding cyclic redundancy check "CRC" bits to a PDCCH payload. The CRC bids may allow the UE 104 to detect errors in the received PDCCH. In some embodiments, a set of 24 CRC bids may be calculated from the PDCCH payload. The CRC bids may be scrambled using a radio network temporary identifier to change some bits from 1 to 0 and others from 0 to 1.

At 208, the process 200 may include channel coding the PDCCH payload and the CRC bits. Polar coding may be used for the PDCCH and the coding rate may depend upon an CCE aggregation level allocated to a PDCCH. A CCE aggregation level may indicate a number of CCEs and, therefore, REGs and resource elements, used for a PDCCH transmission. In various embodiments, the CCE aggregation level may be 1, 2, 4, 8, or 16. In general, the gNB 108 may use a higher CCE aggregation level, which corresponds to a lower coding rate and higher redundancy, for UEs in weak coverage, and lower CCE aggregation levels for UEs in good coverage.

At 212, the process 200 may include rate matching to ensure a number of bits matches a capacity of resource elements available to the PDCCH after accounting for the DMRS that is to be transmitted with the PDCCH. In some embodiments, rate matching may also include an interleaving operation to change an order of the transmitted bits.

At 216, the process 200 may include scrambling the bits using a pseudo-random sequence. Initialization of the pseudo-random sequence may depend upon a type of search space.

At 220, the process 200 may include modulating the scrambled bits to generate a set of modulation symbols. In some embodiments, the modulating may include quadrature phase shift keying "QPSK" modulation.

At 224, the process 200 may include mapping this set of modulation symbols onto resource elements of the resource grid.

The UE 104 may decode a PDCCH transmission using operations that complement the encoding operations of FIG. 2.

Figure 3:
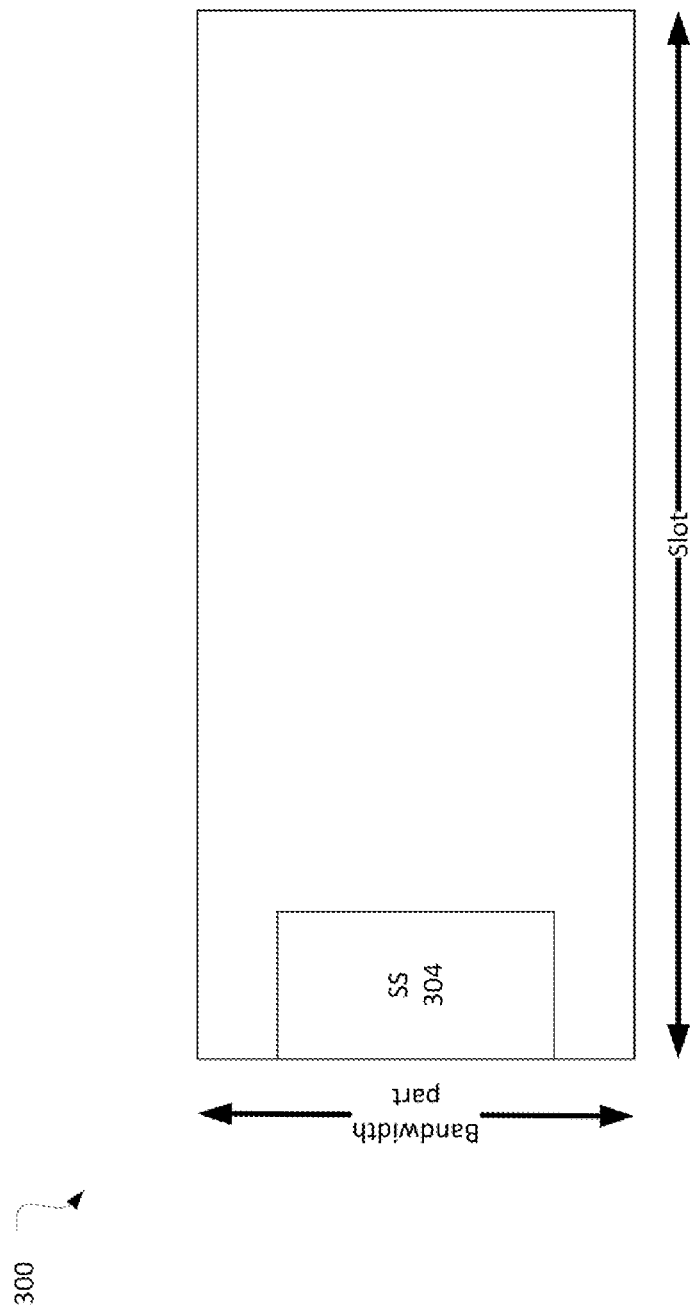
FIG. 3 illustrates downlink resources in accordance with some embodiments.

To decode a PDCCH transmission, the UE 104 may rely on search space "SS" and control channel resource set "CORESET" configurations. FIG. 3 illustrates downlink resources 300 including a search space 304 in accordance with some embodiments. The downlink resources 300 may be one bandwidth part in the frequency domain and one slot in the time domain. A bandwidth part may be a contiguous set of resource blocks. The search space 304 may be configured by SS and CORESET configuration information. The UE 104 may determine a frequency location, number of symbols, and TCI state of the search space 304 based on a CORESET configuration, and may determine a slot and starting symbol index of the search space 304 based on an SS configuration.

In some embodiments, the SS and the CORESET may be configured by RRC signaling. For example, the gNB 108 may use RRC signals to provide a ControlResourceSet information element to configure the CORESET and a SearchSpace information element to configure the search space. In some embodiments, some or all of the configuration information may be predefined and available at the UE 104.

The ControlResourceSet information element may include parameters such as, for example, a control resource set identifier; frequency domain resources; a duration; a CCE-REG mapping type; a precoder granularity; TCI states to add or release; an indication of whether TCI is present in DCI; and a PDCCH DMRS scrambling identifier. In some embodiments, the ControlResourceSet information element may include additional or alternative parameters.

The control resource set identifier identifies the CORESET within a serving cell and it may have a range from 0 to 11, which may be used across all bandwidth parts of a serving cell.

The frequency domain resources may be indicated by an information element that specifies the resource blocks allocated to the CORESET. The information element may be a 45 bit string, with each bit corresponding to a set of six contiguous resource blocks within a downlink bandwidth part.

The duration may be indicated by an information element that indicates a number of symbols allocated to the CORESET. The duration may be one, two, or three OFDM symbols.

The CCE-REG mapping type may indicate whether the CCEs are mapped to the REGs using and interleaved or non-interleaved manner. Interleaved mapping may be used to provide frequency diversity by distributing the REGs that carry the CCEs across a bandwidth part. The non-interleaved mapping may facilitate interference coordination with neighbor cells by focusing the REGs on a smaller portion of the bandwidth part.

The precoder granularity may provide the UE with some knowledge of pre-coding that the base station applies to generate a beam for the PDCCH. In particular, the precoder granularity may provide an indication of whether the same pre-coding weights are used for all resource blocks within a REG bundle, or whether the same pre-coding weights are used for all REGs within a set of contiguous resource blocks.

The indication of TCI states to add or release may provide the UE with beam-related information such as, for example, information about quasi-co-located "QCL" antenna ports to facilitate reception of the PDCCH. Antenna ports may be QCL if they share specific characteristics such as, for example, Doppler shift, Doppler spread, average delay, or delay spread. The CORESET may be QCL with a synchronization signal block "SSB" or a channel state information reference signal "CSI-RS."

A TCI state, which may also be configured by RRC with a TCI state information element, may provide information as to which channel characteristics are common between a PDCCH and an SSB/CSI-RS. QCL Type A may indicate common channel characteristics include Doppler shift, Doppler spread, average delay, and delay spread. QCL Type B may indicate common channel characteristics include Doppler shift and Doppler spread. QCL Type C may indicate common channel characteristics include Doppler shift and average delay. QCL Type D may indicate common channel characteristics include spatial receiver parameters.

The SearchSpace information element may define how and where the UE 104 is to search for PDCCH candidates. Each search space may be associated with one CORESET. The SearchSpace information element may include parameters such as, for example, search space identifier, a CORESET identifier, a monitoring slot periodicity and offset, a duration, a monitoring symbols within slot, and a number of candidates. In some embodiments, the SearchSpace information element may include additional or alternative parameters.

The search space identifier may identify a search space set that is being configured and may be within a range from 0 to 39.

The CORESET identifier may identify a CORESET to which the search space is mapped. The CORESET may determine specific resource blocks available to the search space set and also a number of symbols as described above.

The monitoring slot periodicity and offset may configure the periodicity/offset to define the slots for PDCCH monitoring.

The duration may indicate a number of consecutive slots that a search space lasts in every occasion, for example, upon every period as given in the monitoring slot periodicity and offset. The duration indication may include a range from 2-2559.

The monitoring symbols within slot indication may provide the first symbols for PDCCH monitoring in the slots configured for PDCCH monitoring by the monitoring slot periodicity and offset and duration indications. This indication may be a bit string in which each bit corresponds to a symbol within the slot.

The number of candidates indication may indicate a number of PDCCH candidates per CCE aggregation level. The gNB 108 may use this indication to focus the blind decoding attempts from the UE 104 upon the most appropriate aggregation levels.

A PDCCH that schedules a SIB1 may be transmitted in a Type 0 common search space set "CSS." The Type-0 CSS may have a number of PDCCH candidates per CCE aggregation level as shown in Table 1. See, for example, section 10.1 of 3GPP TS 38.213 v16.2.0 (2020-06).

TABLE 1

| CCE Aggregation Level | Number of Candidates |
|---|---|
| 4 | 4 |
| 8 | 2 |
| 16 | 1 |

As defined in 38.213, 10.1, for each PDCCH candidate, $m_{s,n_{CI}}$, the possible CCEs that may be calculated based on:

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i,$$

where, for any CSS, for any CSS, $Y_{p,n_{s,f}^\mu}=0$; for a user-specific search space "USS," $Y_{p,n_{s,f}^\mu}=(A_p \cdot Y_{p,n_{s,f}^\mu-1}) \bmod D$, $Y_{p,-1}=n_{RNTI} \neq 0$, $A_p=39827$ for pmod3=0, $A_p=39829$ for pmod3=1, $A_p=39839$ for pmod3=2, and $D=65537$; $i=0, \ldots, L-1$; $N_{CCE,p}$ is the number of CCEs, numbered from 0 to $N_{CCE,p}-1$, in CORESET p and, if any, per RB set;

$n_{CI}$ is the carrier indicator field value if the UE is configured with a carrier indicator field by CrossCarrierSchedulingConfig for the serving cell on which PDCCH is monitored; otherwise, including for any CSS, $n_{CI}=0$; $m_{s,n_{CI}}=0, \ldots, M_{s,n_{CI}}^{(L)}-1$, where $M_{s,n_{CI}}^{(L)}$ is the number of PDCCH candidates the UE is configured to monitor for aggregation level L of a search space sets for a serving cell corresponding to $n_{CI}$; for any CSS, $M_{s,max}^{(L)}=M_{s,0}^{(L)}$; and for a USS, $M_{s,max}^{(L)}$ is the maximum of $M_{s,n_{CI}}^{(L)}$ over all configured $n_{CI}$ values for a CCE aggregation level L of search space set s.

The UE 104 may need to blindly decode CCEs with different CCE aggregation levels until it correctly decodes the PDCCH. In some embodiments, to enhance PDCCH coverage, the PDCCH may be transmitted with a number of repetitions. The same or different beams may be applied to each PDCCH repetition and different repetitions may be carried by different search spaces. To facilitate the decoding of PDCCH transmitted repeatedly in multiple search spaces, embodiments describe how to determine the PDCCH in some search spaces are repetitions of one another; and how to perform blind detection with reduced UE complexity.

In some embodiments, search spaces may be divided into search space groups "SSGs." A PDCCH may be repeatedly transmitted in search spaces within the same SSG.

Figure 4:
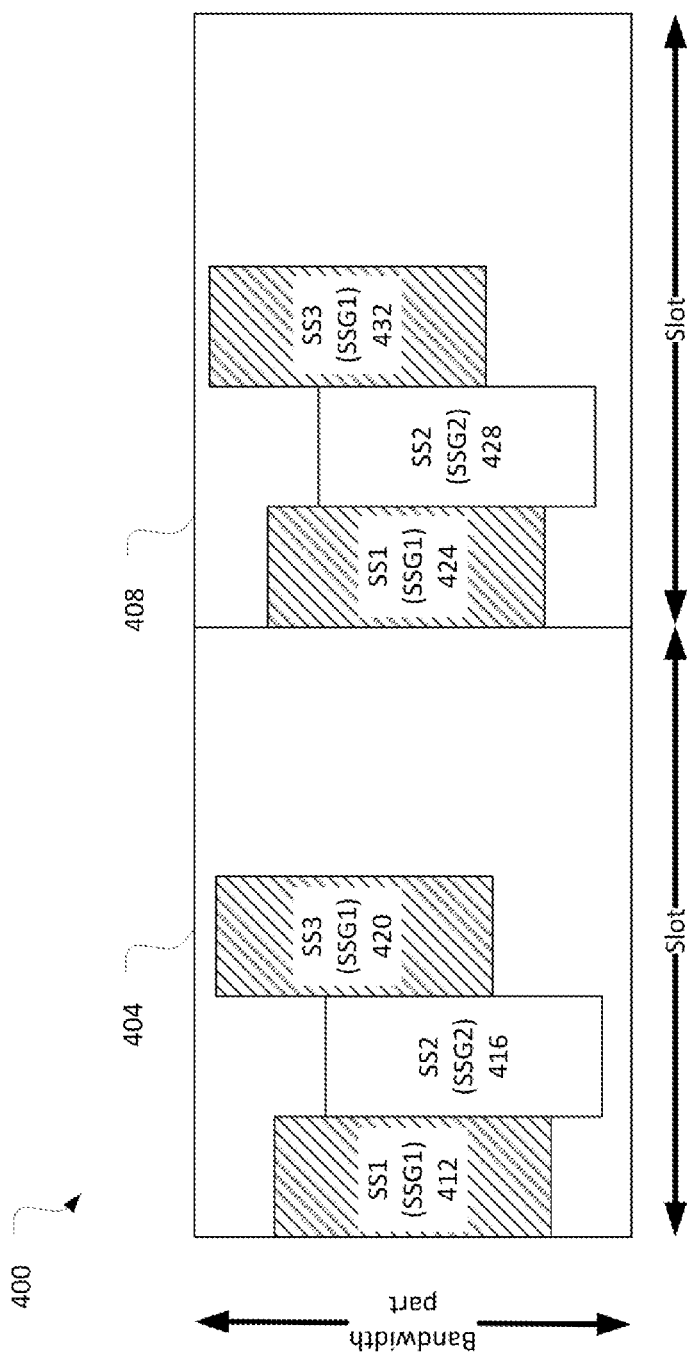
FIG. 4 illustrates downlink resources in accordance with some embodiments.

FIG. 4 illustrates downlink resources 400 in accordance with some embodiments. The downlink resources 400 may include a first repetition unit 404 and a second repetition unit 408. Each repetition unit may have a time-domain dimension and a frequency-domain dimension. As shown, the time-domain dimensions are one slot and the frequency-domain dimensions are one band width part. In some embodiments, the time-domain dimension of a repetition unit may also be referred to as an SSG duration.

Each repetition unit may include three search spaces. The first repetition unit 404 may include a first search space "SS1" 412, a second search space "SS2" 416, and a third search space "SS3" 420. SS1 412 and SS3 420 may both be associated with a first search space group "SSG1"; while SS2 416 is associated with a second search space group "SSG2." The second repetition unit 408 may include SS1 424, SS2 428, and SS3 432. SS1 424 and SS3 432 may both be associated with SSG1, while SS2 428 is associated with SSG2.

The UE 104 may determine that search spaces within a particular repetition unit that are associated with the same search space group may be repetitions of one another. So, for example, SS1 412 and SS3 420 in the first repetition unit 404 may be repetitions of one another. SS2 416 may be a PDCCH transmission that is different from the PDCCH transmissions in SS1 416 and SS3 420. Likewise, SS1 424 and SS3 432 in the second repetition unit 408 may be repetitions of one another and SS2 may be a PDCCH transmission that is different from the PDCCH transmissions in SS1 424 and SS3 432. The PDCCH transmissions in the search spaces of the first repetition unit 404 may be different from the PDCCH transmissions in the search spaces of the second repetition unit 408.

The SSG duration may be based on the duration parameter provided in the search space configurations. In some embodiments, the duration for all search spaces that are associated with the same search space group may be configured to be the same. In other embodiments, at least two of the durations of search spaces within a group may be different from one another. In these embodiments, the SSG duration may be the minimal duration of all search spaces in the group or the maximal duration of all search spaces in the group. In other embodiments, the SSG duration may be another function of the search space durations, for example, the SSG duration may be an average of the search space durations.

While FIG. 4 shows the repetition units having a SSG duration of one slot, other embodiments may have SSG durations greater or less than one slot. Similarly, while FIG. 4 shows the repetition units having one bandwidth part in the frequency domain, other embodiments may have smaller or larger dimensions in the frequency domain. For example, in some embodiments, a frequency-domain dimension of a repetition unit may be a plurality (or all) of the bandwidth parts of a serving cell. In another example, a repetition unit may encompass bandwidth parts in one or more serving cells. The serving cells may be within a band, band group, or across all bands of a frequency range. Thus, search spaces across a plurality of bandwidth parts in a serving cell can be configured with a group for repetitive PDCCH transmissions, or search spaces across serving cells within a band or band group or across all bands can be configured with a group for repetitive PDCCH transmissions.

In some embodiments, the search space group associated with a search space may be configured by higher-layer signaling such as, for example, RRC signaling or MAC signaling (for example, a MAC control element). In some embodiments, the SearchSpace information element may include an SSG parameter to associate the search space with an SSG. In some embodiments, the association of a search space to an SSG may be based on preconfigured information.

It may be noted that SS/CORESET configurations within a group should be configured with the same parameters that would result in the same DCI format. For example, the search space type, TCI present in DCI, and other parameters may be the same to ensure the DCI payload size is the same for each PDCCH repetition.

In some embodiments, the CORESETs may be divided into CORESET groups. The PDCCH may then be transmitted repeatedly in search spaces associated with CORESETs within the same CORESET group.

Figure 5:
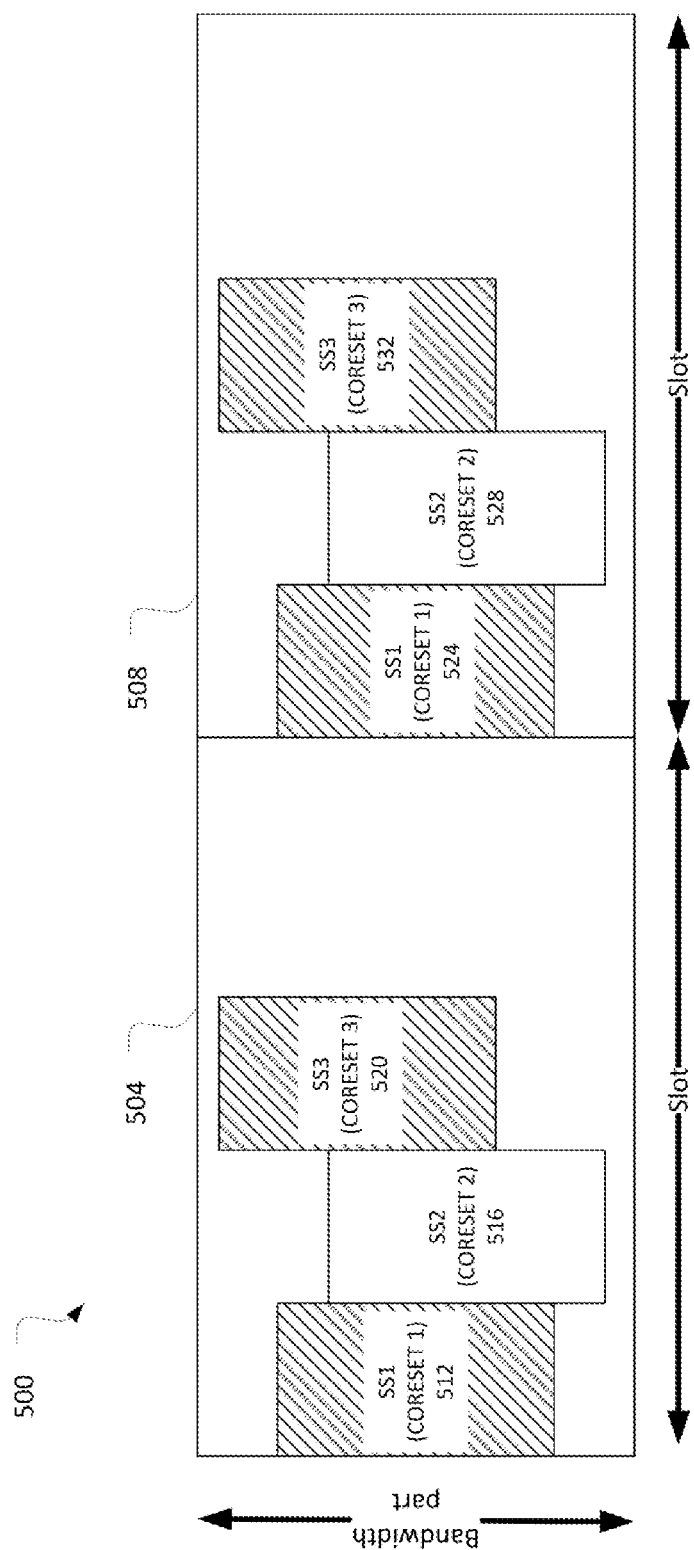
FIG. 5 illustrates downlink resources in accordance with some embodiments.

FIG. 5 illustrates downlink resources 500 in accordance with some embodiments. The downlink resources 500 may include a first repetition unit 504 and a second repetition unit 508. Each repetition unit may have a time-domain dimension and a frequency-domain dimension. As shown, the time-domain dimensions are one slat and the frequency-domain dimensions are one bandwidth part. In some embodiments, the time-domain dimension of a repetition unit may also be referred to as an SSG duration.

Each repetition unit may include three search spaces. The first repetition unit 504 may include SS1 512, SS2 516, and SS3 520. SS1 512 may be associated with CORESET 1, SS2 516 may be associated with CORESET 2, and SS1 520 may be associated with CORESET 3. The second repetition unit 508 may include SS1 524, SS2 528, and SS3 532. SS1 524 may be associated with CORESET 1, SS2 528 may be associated with CORESET 2, and SS3 532 may be associated with CORESET 3.

Consider also that the CORESETs are configured with group indices as shown in Table 2.

TABLE 2

| CORESET | 1 | 2 | 3 |
| --- | --- | --- | --- |
| CORESET GROUP INDEX | 0 | 1 | 0 |

In repetition unit 504, both SS1 512 and SS3 520 are associated with CORESETs of CORESET group 0, for example, CORESET 1 and CORESET 3, respectively. Therefore, the UE 104 may consider PDCCH transmissions within these search spaces to be repetitions. CORESET 2 of SS2 516 is associated with a different CORESET group, for example, CORESET group 1. Therefore, the PDCCH in SS2 516 may be distinct from the PDCCH repetitions of the other search space in the repetition unit 504.

Similarly, in repetition unit 508, both SS1 524 and SS3 532 are associated with CORESETs of CORESET group 0, for example, CORESET 1 and CORESET 3, respectively. Therefore, the UE 104 may consider PDCCH transmissions within these search spaces to be PDCCH repetitions. CORESET 2 of SS2 528 is associated with a different CORESET group, for example, CORESET group 1. Therefore, the PDCCH in SS2 524 may be distinct from the PDCCH repetitions of the other search spaces in the repetition unit 508.

While FIG. 5 shows the repetition units having an SSG duration of one slot, other embodiments may have durations greater or less than one slot. Similarly, while FIG. 5 shows the repetition units having one bandwidth part in the frequency domain, other embodiments may have smaller or larger dimensions in the frequency domain. For example, in some embodiments, a frequency-domain dimension of a repetition unit may be a plurality (or all) of the bandwidth parts of a serving cell. In another example, a repetition unit may include bandwidth parts in one or more serving cells. The serving cells may be within a band, band group, or across all bands. Thus, CORESETs across a plurality of bandwidth parts in a serving cell can be configured with a group for repetitive PDCCH transmissions, or CORESETs across serving cells within a band or band group or across all bands can be configured with a group for repetitive PDCCH transmissions.

In some embodiments, the CORESETs may be associated with respective CORESET groups through higher-layer signaling such as, for example, RRC signaling or MAC signaling (for example, a MAC control element). In some embodiments, the ControlResourceSet information element may include an CORESET group parameter to configure a CORESET with an associated CORESET group. In some embodiments, the association of a CORESET with a CORESET group may be based on preconfigured information.

Figure 6:
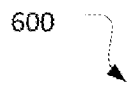
FIG. 6 illustrates physical downlink control channel decoding combinations in accordance with some embodiments.

A receiver of the UE 104 may calculate soft bits for all subcarriers for candidate PDCCH repetitions and may then try different possible CCE combinations to decode a PDCCH. For example, if there are two PDCCH repetitions in respective search spaces, and the candidate PDCCH for each search space is configured with a CCE aggregation level={2, 4}; and number of total CCEs=4, the UE 104 may have to try nine combinations 600 to decode the PDCCH as shown in FIG. 6 in accordance with some embodiments.

In combination 1, the UE 104 may attempt to decode CCEs 1 and 2 from the first search space, and CCEs 1 and 2 from the second search space. In combination 2, the UE 104 may attempt to decode CCEs 1 and 2 from the first search space and CCEs 3 and 4 from the second search space. In combination 3, the UE 104 may attempt to decode CCEs 3 and 4 from the first search space and CCEs 1 and 2 from the second search space. In combination 4, the UE 104 may attempt to decode CCEs 3 and 4 from the first search space and CCEs 3 and 4 from the second search space, in combination 5, the UE 104 may attempt to decode CCEs 1-4 from the first search space and CCEs 1 and 2 from the second search space. In combination 6, the UE 104 may attempt to decode CCEs 1 and 2 from the first search space and CCEs 1-4 from the second search space. In combination 7, the UE 104 may attempt to decode CCEs 1-4 from the first search space in CCEs 3 and 4 from the second search space. In combination 8, the UE 104 may attempt to decode CCEs 1 and 2 from the first search space and CCEs 1-4 from the second search space. In combination 9, the UE 104 may attempt to decode CCEs 1-4 from the first search space and CCEs 1-4 from the second search space.

As the number of total CCEs and the CCE aggregation levels increase, the UE complexity may also become very high. Therefore, some embodiments describe aspects that allow the UE to jointly decode all the PDCCH repetitions with reduced UE complexity for blind detection.

Figure 7:
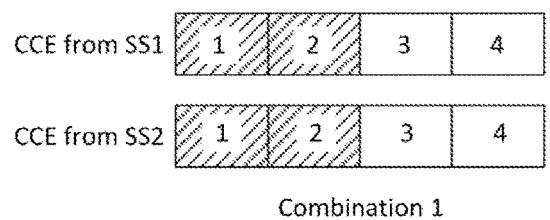
FIG. 7 illustrates physical downlink control channel decoding combinations in accordance with some embodiments.
Figure 7:
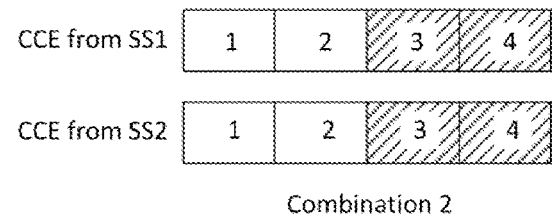
Figure 7:
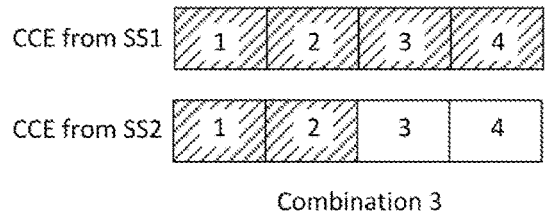
Figure 7:
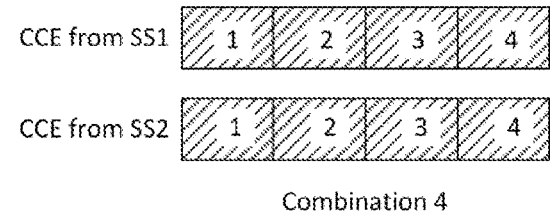
Figure 8:
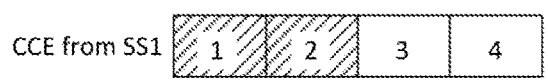
FIG. 8 illustrates physical downlink control channel decoding combinations in accordance with some embodiments.
Figure 8:
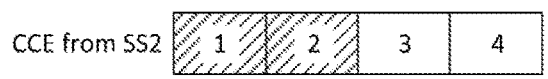
Figure 8:
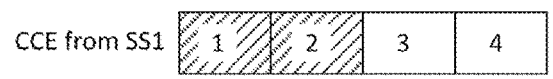
Figure 8:
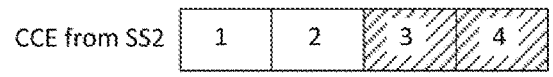
Figure 8:
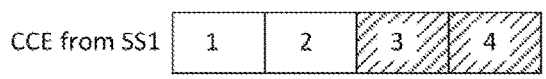
Figure 8:
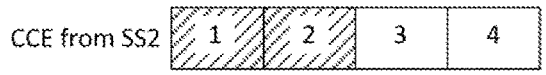
Figure 8:
Figure 8:
Figure 8:
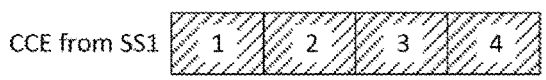
Figure 8:
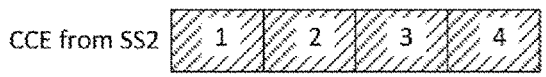
Figure 9:
FIG. 9 illustrates physical downlink control channel decoding combinations in accordance with some embodiments.
Figure 9:
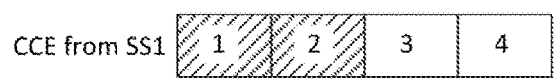
Figure 9:
Figure 9:
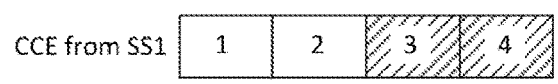
Figure 9:
Figure 9:
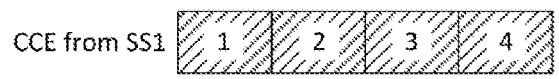
Figure 9:
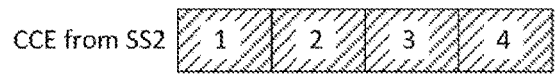

FIGS. 7-9 illustrate various CCE combinations to decode 2 PDCCH repetitions. Candidate PDCCH for each search space may be configured with CCE aggregation level={2,4} and number of total CCEs=4.

FIG. 7 illustrates CCE combinations 700 to decode PDCCH in accordance with some embodiments. In these embodiments, the PDCCH candidate index may be the same for all the PDCCH repetitions. The gNB 108 will restrict the repetitive PDCCH transmissions in different search spaces of a group (or search spaces associated CORESETS of the same group) to include the same PDCCH candidate index. In this manner, the UE 104 may only need to decode four possible combinations.

In combination 1, the UE 104 may attempt to decode CCEs 1 and 2 from the first search space and CCEs 1 and 2 from the second search space. In combination 2, the UE 104 may attempt to decode CCEs 3 and 4 from the first search space and CCEs 3 and 4 from the second search space. In combination 3, the UE 104 may attempt to decode CCEs 1-4 from the first search space and CCEs 1 and 2 from the second search space. It may be noted that even though the aggregation levels are different for the two CCEs in this combination, the PDCCH candidate indices are the same. In combination 4, the UE 104 may attempt to decode CCEs 1-4 from the first search space and CCEs 1-4 from the second search space.

FIG. 8 illustrates CCE combinations to decode PDCCH in accordance with some embodiments. In these embodiments, the CCE aggregation levels may be the same. For example, the gNB 108 will restrict the repetitive PDCCH transmissions in different search spaces of a group (or search spaces associated with CORESETS of the same group) to include the same CCE aggregation level. In this manner, the UE 104 may only need to decode five possible combinations.

In combination 1, the UE 104 may attempt to decode CCEs 1 and 2 from the first search space and CCEs 1 and 2 from the second search space. In combination 2, the UE 104 may attempt to decode CCEs 1 and 2 from the first search space and CCEs 3 and 4 from the second search space. In combination 3, the UE 104 may attempt to decode CCEs 3 and 4 from the first search space and CCEs 1 and 2 from the second search space. In combination 4, the UE 104 may attempt to decode CCEs 3 and 4 from the first search space and CCEs 3 and 4 from the second search space. In combination 5, the UE 104 may attempt to decode CCEs 1-4 from the first search space and CCEs 1-4 from the second search space.

FIG. 9 illustrates CCE combinations to decode PDCCH in accordance with some embodiments. In these embodiments, both the CCE aggregation levels and the PDCCH candidate indices may be the same. For example, the gNB 108 will restrict the repetitive PDCCH transmissions in different search spaces of a group (or search spaces associated CORESETS of the same group) to include the same CCE aggregation level and PDCCH candidate index. In this manner, the UE 104 may only need to decode three possible combinations.

In combination 1, the UE 104 may attempt to decode CCEs 1 and 2 from the first search space and CCEs 1 and 2 from the second search space. In combination 2, the UE 104 may attempt to decode CCEs 3 and 4 from the first search space and CCEs 3 and 4 from the second search space. In combination 3, the UE 104 may attempt to decode CCEs 1-4 from the first search space and CCEs 1-4 from the second search space.

In some embodiments, UE decoding complexity may be further reduced by restricting one or more additional parameters of a search space configuration to be in common among all the search spaces in a group (or search spaces associated with CORESETs with the same group). These parameters may include, but are not limited to, the monitoring slot periodicity and offset, duration, and number of candidates.

In some embodiments, a maximum number of blind detections to decode a PDCCH with repetitions may take into account the different kinds of CCE combinations. The maximum number may be predefined or based on a UE capability. In some embodiments, the UE 104 may signal an indication of the UE capability to the gNB 108. For example, in some embodiments, the UEs 104 may signal a UE capability to the gNB 108 that indicates the UE is not to perform more than three blind detections to decode a PDCCH with repetitions. Thus, in these embodiments, the gNB 108 may restrict the repetitive PDCCH transmissions in different search spaces of a group (or search spaces associated with CORESETS of the same group) to include the same CCE aggregation level and PDCCH candidate index as described above with respect to FIG. 9.

In some embodiments, the UE 104 may decode each of the PDCCH repetitions separately. If the UE 104 successfully decodes a PDCCH repetition in a first search space, the UE 104 may skip PDCCH detection/decoding for other search spaces within the group (or other search spaces associated with CORESETs within the same group).

In some embodiments, the search spaces that are monitored may have an impact on certain downlink processing operations. For example, the UE 104 may determine a default beam for buffering a downlink signal that includes, for example, PDSCH/aperiodic CSI-RS, when a scheduling offset between DCI and the signal scheduled by the DCI is less than a threshold that may be reported by the UE. The default beam may be based on a CORESET with monitored SS in latest slot with lowest ID when there are multiple CORESETs configured. For example, with respect to the PDSCH, if the offset between the DCI and the PDSCH is less than the threshold, the UE 104 may assume that "DM-RS ports of the PDSCH are quasi co-located with the [reference signals] with respect to the QCL parameter(s) used for PDCCH quasi co-location indication of the CORE-SET associated with a monitored search space with the lowest controlResourceSetId in the latest slot in which one or more CORESETs within the active BWP of the serving cell are monitored by the UR" 3GPP TS 38.214 v16.2.0, section 5.1.5 (2020-06). And, with respect to the CSI-RS, if the "scheduling offset between the last symbol of the PDDCH carrying the triggering DCI and the first symbol of the aperiodic CSI-RS resources is smaller than the UE reported threshold [and certain conditions exist] when receiving the aperiodic CSI-RS, the UE applies the QCL assumption used for the CORESET associated with a monitored search space with the lowest controlResourceSetId in the latest slot in which one or more CORESETs within the active BWP of the serving cell are monitored." 3GPP TS 38.214 Section 5.2.1.5.1.

Given that certain search spaces may be skipped in some embodiments when a repeated PDCCH is correctly decoded, the determination of whether the skipped search spaces are considered to be monitored search spaces may be considered. In some embodiments, the skipped search spaces may not be considered as monitored search spaces in a determination of a PDSCH/aperiodic CSI-RS default beam. In other embodiments, the skipped search spaces may be considered as monitored search spaces in the determination of a PDSCH/aperiodic CSI-RS default beam.

In some embodiments, whether UE decodes PDCCH repetition jointly or separately can be configured by higher layer signaling (for example, RRC or MAC signaling) or reported by UE capability.

The last PDCCH detected/decoded may be different depending on whether the PDCCH repetitions are separately or individually decoded. This may lead to some ambiguity with respect to the scheduling offset. Therefore, in some embodiments, for separate decoding of the PDCCH repetitions, the scheduling offset may be determined by the last symbol of the search space for the last PDCCH repetition. And, for joint decoding of the PDCCH repetitions, the scheduling offset may be determined by the last symbol of the PDCCH for the last PDCCH repetition.

Figure 10:
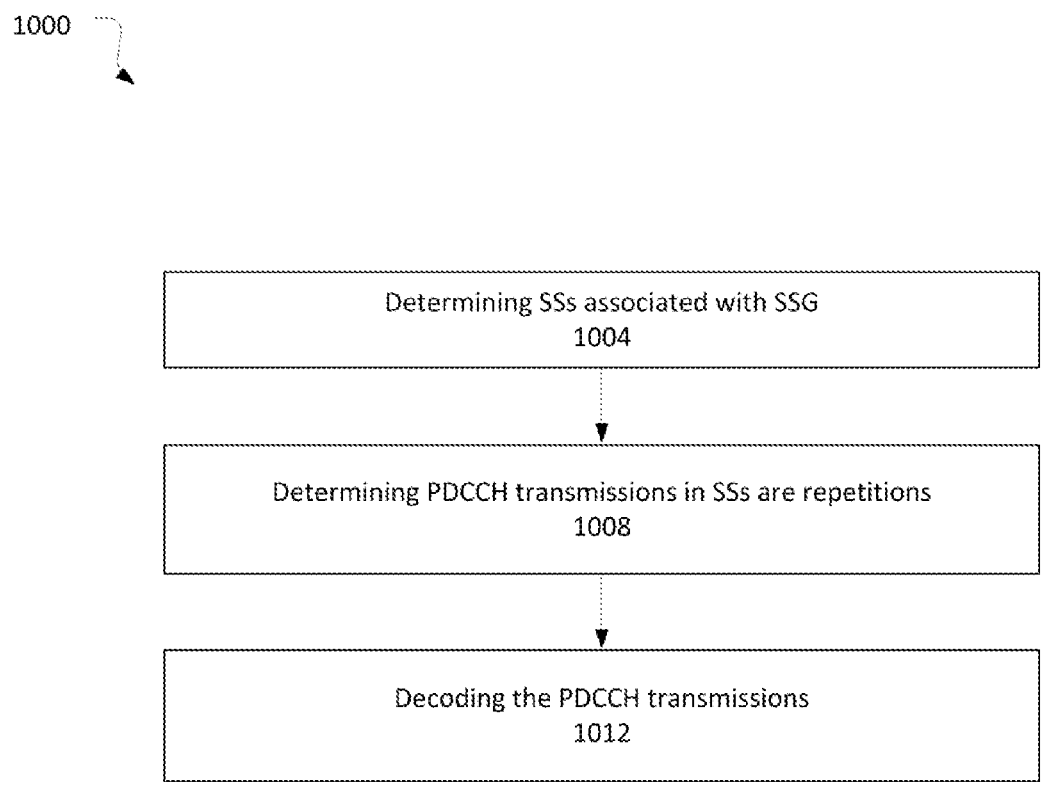
FIG. 10 illustrates an operational flow/algorithmic structure in accordance with some embodiments.

FIG. 10 may include an operation flow/algorithmic structure 1000 in accordance with some embodiments. The operation flow/algorithmic structure 1000 may be performed or implemented by a UE such as, for example, UE 104 or 1300; or components thereof, for example, baseband processor 1304A.

The operation flow/algorithmic structure 1000 may include, at 1004, determining a plurality of search spaces are associated with a search space group. In some embodiments, the determining at 1004 may be based on configuration information received from a gNB. The configuration information may configure each search space with an SSG index. Thus, search spaces having the same SSG index may be considered to be associated with the same SSG.

In various embodiments, the configuration information may be provided to the UE through higher-layer signaling. For example, the configuration information may be provided to the UE through RRC signaling or a MAC CE.

The operation flow/algorithmic structure 1000 may further include, at 1008, determining PDCCH transmissions in the search spaces are repetitions. The UE may determine that PDCCH transmissions in search spaces associated with a common SSG and being within a repetition unit may be repetitions of one another. A repetition unit may define a frequency- or time-domain in which SSs of a particular group are to include repetitive PDCCH transmissions. For example, the repetition unit may include a frequency range, for example, a bandwidth part, and an SSG duration, for example, one slot. Therefore, in this example, all PDCCH transmissions of search spaces associated with the same SSG, and within a BWP and an SSG duration, may be considered as repetitions.

In some embodiments, the SSG duration may be based on durations associated with each of the search spaces. For example, if all of the search spaces have a common duration, the SSG duration may be set to the common duration. If, however, at least some of the search spaces have different search space durations, the SSG duration may be a function of the individual search space durations. For example, in some embodiments, the SSG duration may be set to the largest of the individual durations, for example, the maximal duration of the set. In other embodiments, the SSG duration may be set to the smallest of the individual durations, for example, the minimal duration of the set. In still other embodiments, other functions may be used such as, for example, taking an average of the durations of the set.

In addition to time-domain restrictions provided by the SSG duration, other time/frequency restrictions may additionally/alternatively apply. For example, in some embodiments only search spaces within a common bandwidth part may be considered within a group that determines repetitive PDCCH transmissions. In another example, search spaces across a plurality of bandwidth parts (up to all bandwidth parts) of a serving cell may be considered within a group that determines repetitive PDCCH transmissions. In yet another example, search spaces across a plurality of serving cells within a band or band group, or across all bands may be considered within a group that determines repetitive PDCCH transmissions.

The operation flow/algorithmic structure 1000 may further include, at 1012, decoding the PDCCH transmissions determined to be repetitions. Because each repetition of the PDCCH transmission contains the same information including, for example, data and parity bits, a receiver of the UE may combine the decoding efforts of individual repetitions to take advantage of the repetition coding. For example, in some embodiments the receiver may perform Chase combining to combine received bits of a PDCCH repetition with the same bits from previous PDCCH repetitions. Thus, every successive repetition may add energy to a PDCCH transmission and, therefore, increase a cumulative signal-to-noise ratio.

In other embodiments, the PDCCH repetitions may be separately decoded. In the event that one repetition is successfully decoded, subsequent repetitions may be skipped.

In some embodiments, a UE may be configured to jointly or separately decode PDCCH repetitions by higher-layer signaling such as, for example, RRC or MAC signaling. In some embodiments, the UE may provide an indication, to a gNB, as to whether the UE is capable of jointly decoding or separately decoding PDCCH repetitions.

Figure 11:
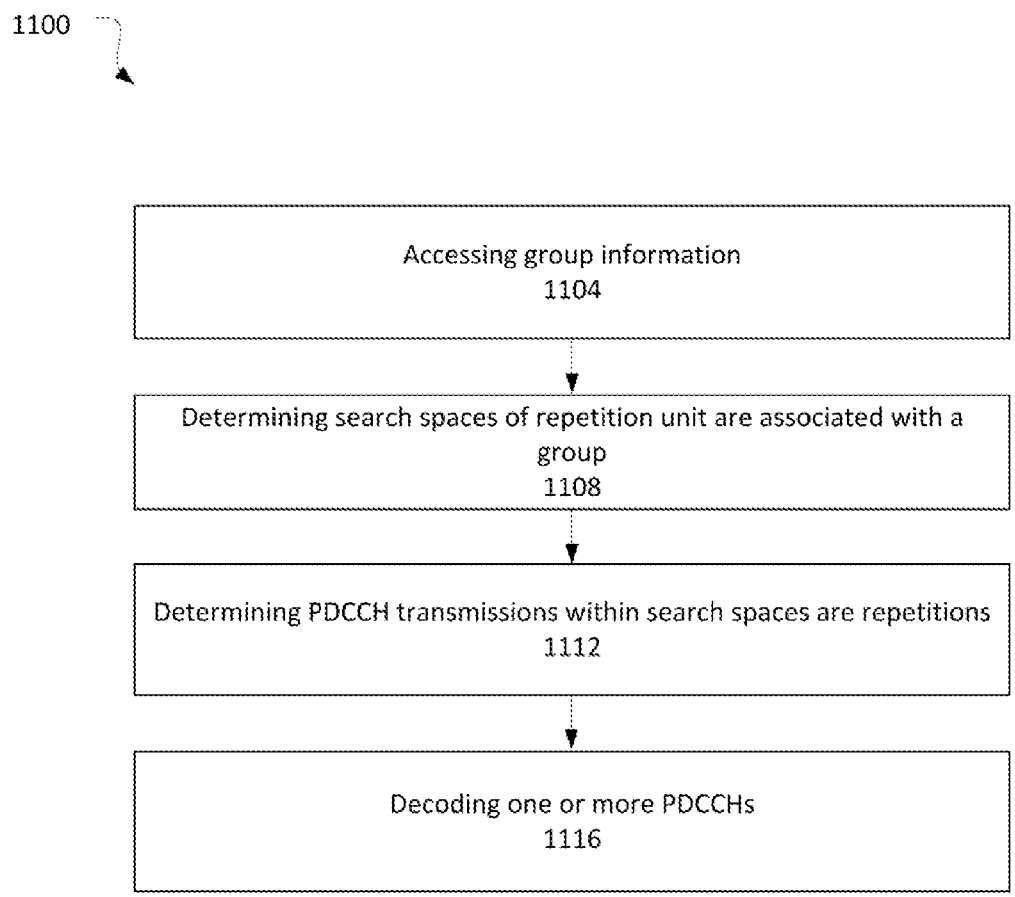
FIG. 11 illustrates an operational flow/algorithmic structure in accordance with some embodiments.

FIG. 11 may include an operation flow/algorithmic structure 1100 in accordance with some embodiments. The operation flow/algorithmic structure 1100 may be performed or implemented by a UE such as, for example, UE 104 or 1300; or components thereof, for example, baseband processor 1304A.

The operation flow/algorithmic structure 1100 may include, at 1104, accessing group information. The group information may be accessed from memory of a device. In some embodiments, a UE may extract the group information from configuration information received from a gNB and store the extracted group information in the memory. The configuration information may be, for example, CORESET configuration information or search space configuration information. The group information may include information to associate search spaces with groups. The group information may include search space group information or CORESET group information. In some embodiments, the group information may further include information that indicates dimensions of a repetition unit.

The operation flow/algorithmic structure 1100 may further include, at 1108, determining search spaces of a repetition unit that are associated with a group. The UE may identify search spaces that are associated with the common group within a repetition unit based on the group information accessed from memory. For example, all search spaces that are configured with the same search space group index, as provided by the group information, may be determined to be associated with the common group. In another example, all search spaces that are associated with CORESETs that are configured with the same CORESET group index, as provided by the group information, may be determined to be associated with the common group.

The operation flow/algorithmic structure 1100 may further include, at 1112, determining PDCCH transmissions within the search spaces are repetitions. The UE may determine that all PDCCH transmissions within search spaces associated with a group and within a particular repetition unit are repetitions of one another.

The operation flow/algorithmic structure 1100 may further include, at 1116, decoding one or more PDCCHs of the repeated PDCCH transmissions. The UE may separately or jointly decode the PDCCHs as described above with respect to the decoding of 1012.

Figure 12:
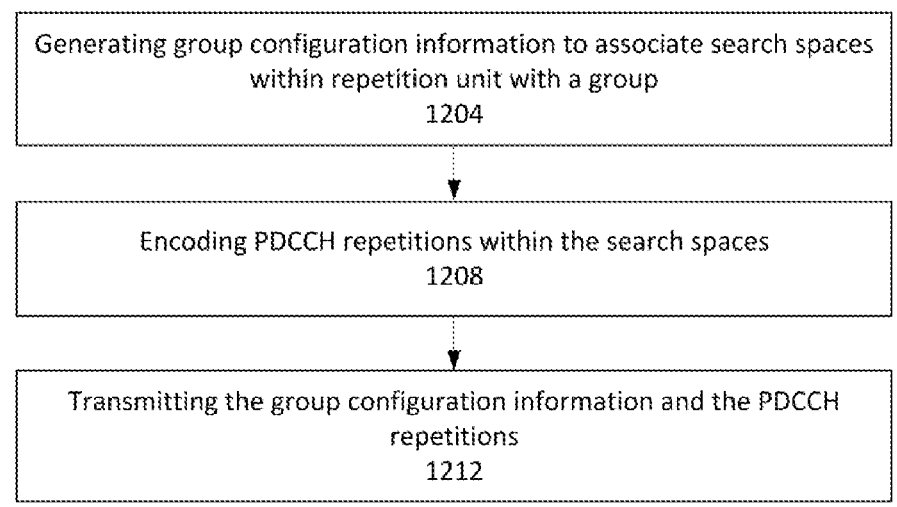
FIG. 12 illustrates an operational flow/algorithmic structure in accordance with some embodiments.

FIG. 12 may include an operation flow/algorithmic structure 1200 in accordance with some embodiments. In some embodiments, the operation low/algorithmic structure 1200 may be performed or implemented by a gNB, for example, gNB 108 or 1400; or components thereof, for example, baseband processor 1404A.

The operation flow/algorithmic structure 1200 may include, at 1204, generating group configuration information to associate search spaces within a repetition unit with a group. In some embodiments, the group configuration information may be generated by construction of a search space information element that associates the search space with a search space group. In other embodiments, the group configuration information may be generated by construction of a CORESET information element to associate CORESETs with a CORESET group.

The operation flow/algorithmic structure 1200 may further include, at 1208, encoding PDCCH repetitions within the search spaces. In various embodiments, the PDCCH repetitions may include 2, 4, 8, or 16 repetitions. In some embodiments, the gNB may determine that a PDCCH directed to a UE that has less receive functionalities may include more repetitions. Less receive functionalities may be based on: a simplified UE design (for example, a reduced capability UE, machine-type communication UE, IoT UE); network conditions; or location of the UE (for example, cell-edge UE). The gNB may determine that a PDCCH directed to a UE that has greater receive functionalities may include less repetitions.

In some embodiments, the gNB may encode the plurality of PDCCH repetitions in a manner to restrict the number of blind decoding attempts that a UE may need. For example, the gNB may encode the plurality PDCCH repetitions with a common PDCCH candidate index or a common CCE aggregation level. In some embodiments, encoding the PDCCH repetitions to restrict the number of blind decoding attempts may be based on a UE capability message transmitted to the gNB from the UE.

The operation flow/algorithmic structure 1200 may further include, at 1212, transmitting the group configuration information and the PDCCH repetitions. The group configuration information may be transmitted using RRC or MAC signaling.

Figure 13:
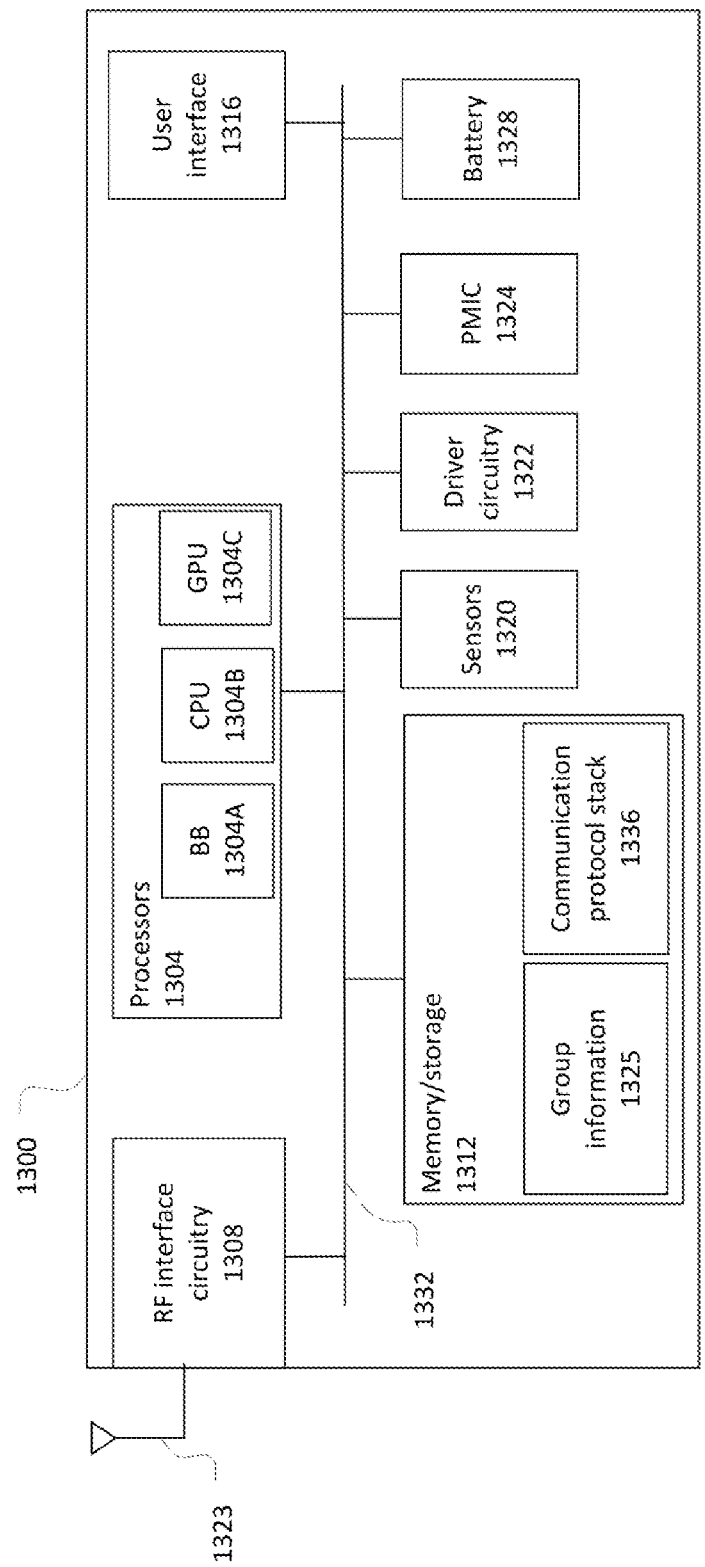
FIG. 13 illustrates a user equipment in accordance with some embodiments.

FIG. 13 illustrates a UE 1300 in accordance with some embodiments. The UE 1300 may be similar to and substantially interchangeable with UE 104 of FIG. 1.

Similar to that described above with respect to UE 104, the UE 1300 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.) video surveillance/monitoring devices (for example, cameras, video cameras, etc.) wearable devices; relaxed-IoT devices. In some embodiments, the UE, may be a RedCap UE or NR-Light UE.

The UE 1300 may include processors 1304, RF interface circuitry 1308, memory/storage 1312, user interface 1316, sensors 1320, driver circuitry 1322, power management integrated circuit "PMIC" 1324, and battery 1328. The components of the UE 1300 may be implemented as integrated circuits "ICs," portions thereof, discrete electronic devices, or other modules, logic, hardware, software, firmware, or a combination thereof. The block diagram of FIG. 13 is intended to show a high-level view of some of the components of the UE 1300. However, some of the components shown may be omitted, additional components may be present, and different arrangement of the components shown may occur in other implementations.

The components of the UE 1300 may be coupled with various other components over one or more interconnects 1332, which may represent any type of interface, input/output, bus (local, system, or expansion), transmission line, trace, optical connection, etc. that allows various circuit components (on common or different chips or chipsets) to interact with one another.

The processors 1304 may include processor circuitry such as, for example, baseband processor circuitry "BB" 1304A, central processor unit circuitry "CPU" 1304B, and graphics processor unit circuitry "GPU" 1304C. The processors 1304 may include any type of circuitry or processor circuitry that executes or otherwise operates computer-executable instructions, such as program code, software modules, or functional processes from memory/storage 1312 to cause the UE 1300 to perform operations as described herein.

In some embodiments, the baseband processor circuitry 1304A may access a communication protocol stack 1336 in the memory/storage 1312 to communicate over a 3GPP compatible network. In general, the baseband processor circuitry 1304A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1308.

The baseband processor circuitry 1304A may generate or process baseband signals or waveforms that carry information in 3GPP-compatible networks. In some embodiments, the waveforms for NR may be based cyclic prefix OFDM "CP-ODM" in the uplink or downlink, and discrete Fourier transform spread OFDM "DFT-S-OFDM" in the uplink.

The baseband processor circuitry 1304A may also access group information 1325 from memory/storage 1312 to determine search space groups in which a number of repetitions of a PDCCH may be transmitted.

The memory/storage 1312 may include any type of volatile or non-volatile memory that may be distributed throughout the UE 1300. In some embodiments, some of the memory/storage 1312 may be located on the processors 1304 themselves (for example, L1 and L2 cache), while other memory/storage 1312 is external to the processors 1304 but accessible thereto via a memory interface. The memory/storage 1312 may include any suitable volatile or non-volatile memory such as, but not limited to, dynamic random access memory "DRAM," static random access memory "SRAM," eraseable programmable read only memory "EPROM," electrically eraseable programmable read only memory "EEPROM," Flash memory, solid-state memory, or any other type of memory device technology.

The RF interface circuitry 1308 may include transceiver circuitry and radio frequency front module "RFEM" that allows the UE 1300 to communicate with other devices over a radio access network. The RF interface circuitry 1308 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1323 and proceed to filter and amplify (with a low-noise amplifier) the signal. The signal may be provided to a receiver of the transceiver that down-converts the RF signal into a baseband signal that is provided to the baseband processor of the processors 1304.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1323.

In various embodiments, the RF interface circuitry 1308 may be configured to transmit/receive signals in a manner compatible with NR access technologies.

The antenna 1323 may include a number of antenna elements that each convert electrical signals into radio waves to travel through the air and to convert received radio waves into electrical signals. The antenna elements may be arranged into one or more antenna panels. The antenna 1323 may have antenna panels that are omnidirectional, directional, or a combination thereof to enable beamforming and multiple input, multiple output communications. The antenna 1323 may include microstrip antennas, printed antennas fabricated on the surface of one or more printed circuit boards, patch antennas, phased array antennas, etc. The antenna 1323 may have one or more panels designed for specific frequency bands including bands in FR1 or FR2.

The user interface circuitry 1316 includes various input/output (I/O) devices designed to enable user interaction with the UE 1300. The user interface 1316 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1300.

The sensors 1320 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like), depth sensors, ambient light sensors, ultrasonic transceivers; microphones or other like audio capture devices; etc.

The driver circuitry 1322 may include software and hardware elements that operate to control particular devices that are embedded in the UE 1300, attached to the UE 1300, or otherwise communicatively coupled with the UE 1300. The driver circuitry 1322 may include individual drivers allowing other components to interact with or control various input/output (I/O) devices that may be present within, or connected to, the UE 1300. For example, driver circuitry 1322 may include a display driver to control and allow access to a display device, a touchscreen driver to control and allow access to a touchscreen interface, sensor drivers to obtain sensor readings of sensor circuitry 1320 and control and allow access to sensor circuitry 1320, drivers to obtain actuator positions of electro-mechanic components or control and allow access to the electro-mechanic components, a camera driver to control and allow access to an embedded image capture device, audio drivers to control and allow access to one or more audio devices.

The power management integrated circuitry "PMIC" 1324 may manage power provided to various components of the UE 1300. In particular, with respect to the processors 1304, the PMIC 1324 may control power-source selection, voltage scaling, battery charging, or DC-to-DC conversion.

In some embodiments, the PMIC 1324 may control, or otherwise be part of, various power saving mechanisms of the UE 1300. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1300 may power down for brief intervals of time and thus save power. If there is no data traffic activity for an extended period of time, then the UE 1300 may transition off to an RRC Idle state, where it disconnects from the network and does not perform operations such as channel quality feedback, handover, etc. The UE 1300 goes into a very low power state and it performs paging where again it periodically wakes up to listen to the network and then powers down again. The UE 1300 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1328 may power the UE 1300, although in some examples the UE 1300 may be mounted deployed in a fixed location, and may have a power supply coupled to an electrical grid. The battery 1328 may be a lithium ion battery, a metal-air battery, such as a zinc-air battery, an aluminum-air battery, a lithium-air battery, and the like. In some implementations, such as in vehicle-based applications, the battery 1328 may be a typical lead-acid automotive battery.

Figure 14:
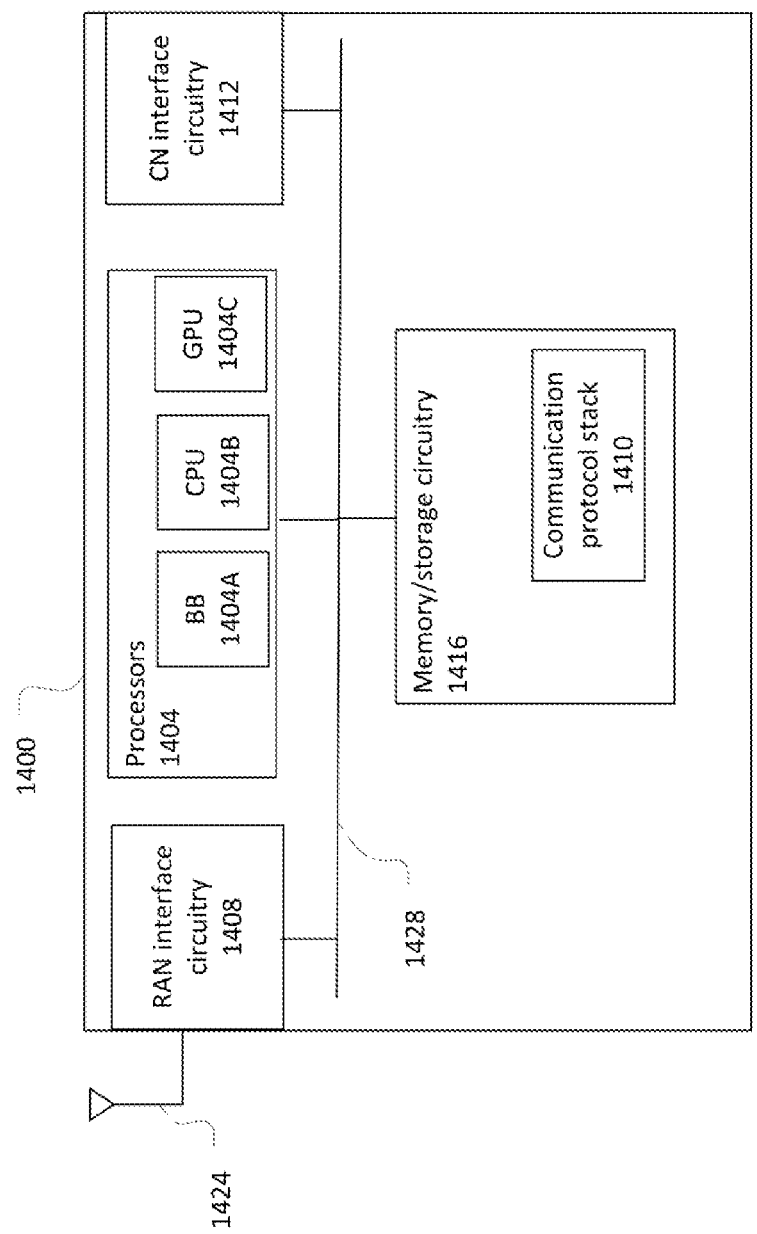
FIG. 14 illustrates a gNB in accordance with some embodiments.

FIG. 14 illustrates a gNB 1400 in accordance with some embodiments. The gNB node 1400 may similar to and substantially interchangeable with gNB 148.

The gNB 1400 may include processors 1404, RF interface circuitry 1408, core network "CN" interface circuitry 1412, and memory/storage circuitry 1416.

The components of the gNB 1400 may be coupled with various other components over one or more interconnects 1428.

The processors 1404, RF interface circuitry 1408, memory/storage circuitry 1416 (including communication protocol stack 1410), antenna 1424, and interconnects 1428 may be similar to like-named elements shown and described with respect to FIG. 13.

The CN interface circuitry 1412 may provide connectivity to a core network, for example, a 5$^{th}$ Generation Core network "5GC" using a 5GC-compatible network interface protocol such as carrier Ethernet protocols, or some other suitable protocol. Network connectivity may be provided to/from the gNB 1400 via a fiber optic or wireless backhaul. The CN interface circuitry 1412 may include one or more dedicated processors or FPGAs to communicate using one or more of the aforementioned protocols. In some implementations, the CN interface circuitry 1412 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes method of operating a UE, comprising: determining a plurality of search spaces within a repetition unit are associated with a search space group "SSG"; determining, based on the SSG, physical downlink control channel "PDCCH" transmissions in the plurality of search spaces are repetitions; and decoding one or more of the PDCCH transmissions in the plurality of search spaces based on determination the PDCCH transmissions are repetitions.

Example 2 includes method of example 1 or some other example herein, wherein the repetition unit includes an SSG duration and the plurality of search spaces include individual durations that are equal to one another and the SSG duration.

Example 3 includes the method of example 1, wherein the repetition unit includes an SSG duration and the plurality of search spaces include individual search space durations, at least two of Which are unequal, and the method further comprises determining the SSG duration is a minimal duration of the plurality of search space durations or a maximal duration of the plurality of search space durations.

Example 4 includes the method of example 1 or some other example herein, further comprising: processing radio resource control or media access control signaling to determine group indices for the plurality of search spaces; and determining the plurality of search spaces within the repetition unit are associated with the SSG based on the group indices.

Example 5 includes method of example 1 or some other example herein, wherein the repetition unit includes a frequency-domain dimension of one bandwidth part.

Example 6 includes the method of example 1 or some other example herein, wherein the repetition unit includes a frequency-domain dimension of a plurality of bandwidth parts in one or more serving cells.

Example 7 includes a method of example 6 or some other example herein, wherein the one or more serving cells are within one band, one band group, or across all bands of a frequency range.

Example 8 includes the method of example 1 or some other example herein, further comprising: processing configuration information that configures the plurality of search spaces with parameters that result in a downlink control information "DCI" format shared among the plurality of search spaces.

Example 9 includes a method of example 1 or some other example herein, wherein decoding one or more of the PDCCH transmissions comprises jointly decoding the PDCCH transmissions.

Example 10 includes a method of operating UE, the method comprising accessing the group information; determining, based on the group information, a plurality of search spaces within a repetition unit are associated with a group; determining physical downlink control channel "PDCCH" transmissions within the plurality of search spaces are repetitions; and decoding one or more of the PDCCH transmissions.

Example 11 includes a method of example 10 or some other example herein, wherein the group information is to associate a plurality of control resource set "CORESETs" with a CORESET group and the method further comprises: processing configuration information that is to: associate individual search spaces with a respective control resource set "CORESET" of a plurality of CORESETs; and associate the plurality of CORESETs with a CORESET group; and storing the group information in the memory based on the configuration information.

Example 12 includes the method of example 11 or some other example herein, wherein determining the PDCCH transmissions within the plurality of search spaces are repetitions comprises: determining that each of the plurality of search spaces are associated with one of the plurality of CORESETs associated with the CORESET group.

Example 13 includes a method of example 10 or some other example herein, further comprising: successfully decoding a first PDCCH transmission of the PDCCH transmissions; and skipping decoding of second PDCCH transmission of the plurality of PDCCH transmissions based on said successful decoding of the first PDCCH transmission.

Example 14 includes method of example 13 or some other example herein, further comprising: determining a plurality of monitored search spaces to include a search space that includes the second PDCCH transmission; and determining, based on the plurality of monitored search spaces, a default beam for a physical downlink shared channel or aperiodic channel state information—reference signal.

Example 15 includes the method of example 13 or some other example herein, further comprising: determining one or more monitored search spaces to not include a search space that includes the second PDCCH transmission; and determining, based on the one or more monitored search spaces, a default beam for a physical downlink shared channel or aperiodic channel state information—reference signal.

Example 16 includes method of example 10 or some other example herein, wherein the method further comprises: jointly decoding the PDCCH transmissions; and determining a scheduling offset between the PDCCH transmissions and a signal scheduled by downlink control information "DCI" based on a last symbol of a last repetition of the PDCCH transmissions.

Example 17 includes the method of example 10 or some other example herein, further comprising: separately decoding one or more of the PDCCH transmissions; and determining a scheduling offset between the PDCCH transmissions and a signal scheduled by downlink control information "DCI" based on a last symbol of a last search space of the plurality of search spaces.

Example 18 includes a method of operating a gNB comprising: generating group configuration information to associate a plurality of search spaces within a repetition unit with a group; encoding a plurality of physical downlink control channel "PDCCH" repetitions within the plurality of search spaces; and transmitting the group configuration information and the plurality of PDCCH repetitions.

Example 19 includes the method of example 18 or some other example herein, wherein the group configuration information comprises: a search space information element "IE" to associate a search space with a search space group; or a control resource set "CORESET" IE to associate a CORESET with a CORESET group.

Example 20 includes the method of example 18 or some other example herein, wherein encoding the plurality of PDCCH repetitions further comprises: encoding the plurality of PDCCH repetitions with a common PDCCH candidate index or a common control channel element "CCE" aggregation level.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-64, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed by one or more processors, cause a device to:
   determine a plurality of search spaces within a repetition unit are associated with a search space group (SSG);

determine, based on the SSG, physical downlink control channel (PDCCH) transmissions in the plurality of search spaces are repetitions; and decode one or more of the PDCCH transmissions in the plurality of search spaces based on determination the PDCCH transmissions are repetitions.

2. The one or more non-transitory computer-readable media of claim 1, wherein the plurality of search spaces associated with the SSG include individual durations that are equal to one another.

3. The one or more-non-transitory computer-readable media of claim 1, wherein the repetition unit includes an SSG duration and the plurality of search spaces include individual search space durations, at least two of which are unequal, and the instructions, when executed, further cause the device to:

determine the SSG duration is a minimal duration of the individual search space durations or a maximal duration of the individual search space durations.

4. The one or more non-transitory computer-readable media of claim 1, wherein the instructions, when executed, further cause the device to:

process radio resource control signaling to determine group indices for the plurality of search spaces; and determine the plurality of search spaces within the repetition unit are associated with the SSG based on the group indices.

5. The one or more non-transitory computer-readable media of claim 1, wherein the repetition unit includes a frequency-domain dimension of one bandwidth part.

6. The one or more non-transitory computer-readable media of claim 1, wherein the repetition unit includes a time-domain dimension of one slot.

7. The one or more non-transitory computer-readable media of claim 1, wherein the repetition unit includes a frequency-domain dimension of a plurality of bandwidth parts in one or more serving cells that are within one band, one band group, or across all bands of a frequency range.

8. The one or more non-transitory computer-readable media of claim 1, wherein the instructions, when executed, further cause the device to:

process configuration information that configures the plurality of search spaces with parameters that result in a downlink control information (DCI) format shared among the plurality of search spaces.

9. The one or more non-transitory computer-readable media of claim 1, wherein to decode one or more of the PDCCH transmissions, the instructions, when executed, further cause the device to:

jointly decode the PDCCH transmissions.

10. A device comprising:

memory to store group information;

processing circuitry coupled with the memory to access the group information, the processing circuitry to:

determine, based on the group information, a plurality of search spaces within a repetition unit are associated with a group;

determine a plurality of physical downlink control channel (PDCCH) transmissions within the plurality of search spaces are repetitions; and decode one or more of the plurality of PDCCH transmissions.

11. The device of claim 10, wherein the group information is to associate a plurality of control resource sets (CORESETs) with a CORESET group and the processing circuitry is further to:

process configuration information that is to: associate individual search spaces with a respective CORESET of a plurality of CORESETs; and associate the plurality of CORESETs with the CORESET group; and store the group information in the memory based on the configuration information.

12. The device of claim 11, wherein to determine the PDCCH transmissions within the plurality of search spaces are repetitions, the processing circuitry is to:

determine that each of the plurality of search spaces are associated with one of the plurality of CORESETs associated with the CORESET group.

13. The device of claim 10, wherein the plurality of search spaces includes a first search space and a second search space and the processing circuitry is further to:

monitor the first search space for a first PDCCH transmission of the plurality of PDCCH transmissions and the second search space for a second PDCCH transmission of the plurality of PDCCH transmissions using one or more common parameters, the one or more common parameters to include a periodicity, a slot offset, or a duration.

14. The device of claim 10, wherein the processing circuitry is further to:

transmit an indication of a capability of the device to process a maximum number of blind detections to decode PDCCH with repetitions.

15. The device of claim 10, wherein the plurality of search spaces includes a first search space and a second search space and the processing circuitry is further to:

monitor for a first PDCCH transmission of the plurality of PDCCH transmissions in the first search space based on a first control channel element (CCE) aggregation level and a first PDCCH candidate index; and monitor for a second PDCCH transmission of the plurality of PDCCH transmission in the second search space based on the first CCE aggregation level and the first PDCCH candidate index.

16. The device of claim 10, wherein the processing circuitry is further to:

jointly decode the PDCCH transmissions; and determine a scheduling offset between the PDCCH transmissions and a signal scheduled by downlink control information (DCI) based on a last symbol of a last repetition of the PDCCH transmissions.

17. The device of claim 10, wherein the plurality of search spaces includes a first search space and a second search space and the processing circuitry is further to:

monitor one or more control channel elements (CCEs) of the first search space for a first PDCCH transmission of the plurality of PDCCH transmissions, the one or more CCEs of the first search space having one or more first CCE indexes, respectively; and monitor one or more CCEs of the second search space for a second PDCCH transmission of the plurality of PDCCH transmissions, the one or more CCEs of the second search space having the one or more first CCE indexes, respectively.

18. A method of operating a gNB comprising:

generating group configuration information to associate a plurality of search spaces within a repetition unit with a group;

encoding a plurality of physical downlink control channel (PDCCH) repetitions within the plurality of search spaces; and transmitting the group configuration information and the plurality of PDCCH repetitions.

19. The method of claim 18, wherein the group configuration information comprises: a search space information element (IE) to associate a search space with a search space group; or a control resource set (CORESET) IE to associate a CORESET with a CORESET group.

20. The method of claim 18, wherein encoding the plurality of PDCCH repetitions further comprises:
   encoding the plurality of PDCCH repetitions with a common PDCCH candidate index or a common control channel element (CCE) aggregation level.

* * * * *